United States Patent
Price

[11] 3,813,783
[45] June 4, 1974

[54] RADIO NAVIGATION PLOTTER

[76] Inventor: Richard J. Price, 1427 W. Mango St., Lantana, Fla. 33460

[22] Filed: Feb. 22, 1972

[21] Appl. No.: 227,975

[52] U.S. Cl. ............................... 33/1 SD, 33/76 V
[51] Int. Cl. ............................................ G01c 21/20
[58] Field of Search ............ 33/1 R, 1 C, 1 CC, 1 B, 33/1 D, 1 E, 1 G, 76 VA, 1 SD, 98; 235/61 NV

[56] References Cited
UNITED STATES PATENTS

| | | | |
|---|---|---|---|
| 3,063,626 | 11/1962 | Kritser | 33/76 VA X |
| 3,271,866 | 9/1966 | Gruber et al. | 33/76 VA X |
| 3,281,942 | 11/1966 | Preuit | 33/76 VA X |
| 3,535,788 | 10/1970 | Sena | 33/1 SD |
| 3,611,574 | 10/1971 | Young et al. | 33/76 VA |

*Primary Examiner*—John W. Huckert
*Assistant Examiner*—Milton S. Gerstein
*Attorney, Agent, or Firm*—Oltman and Flynn

[57] ABSTRACT

A radio navigation plotter having: (1) a circular transparent upper disc with a 360 degree scale on its periphery and a circular line for registration with an OMNI station circle on a chart; (2) a circular transparent lower disc having a center marking, a diametrical North-South line, and two series each of closely spaced North-South and East-West lines to facilitate aligning the diametrical North-South line with a North-South line on a chart; and (3) an elongated arm pivoted centrally on the discs and having a longitudinal slot extending radially outward at one side of the discs and a bearing marker registering with the 360 degree scale on the upper disc at the opposite side.

4 Claims, 3 Drawing Figures

PATENTED JUN 4 1974    3,813,783
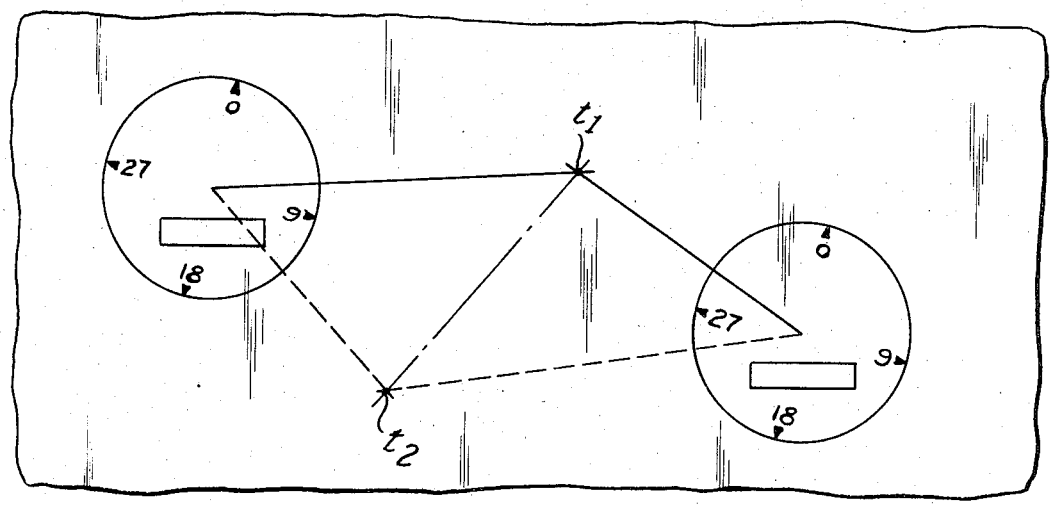
Fig. 1
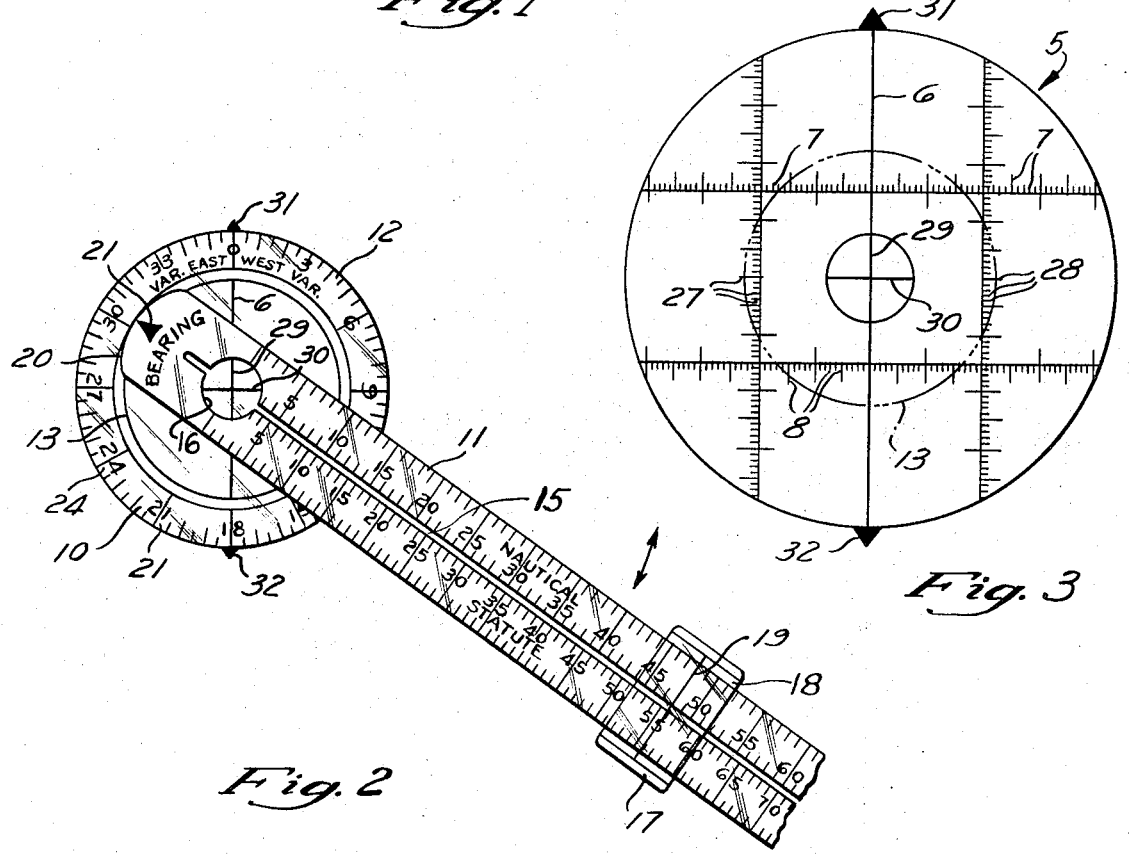
Fig. 2
Fig. 3

RADIO NAVIGATION PLOTTER

BACKGROUND OF THE INVENTION

Various radio navigation plotters, particularly for aircraft, have been proposed heretofore to assist the pilot in locating his position and plotting his course. In general, the use of such plotters has been unnecessarily laborious and time-consuming Also, in using such plotters the pilot may be required to make a mental computation of one or more variables which must be entered into the plotter. For example, when using ADF (automatic direction finding) equipment on the aircraft to plot its course or determine its position from the radio signals transmitted by low frequency range stations or commercial radio stations, the magnetic variation must be compensated for, so as to enable the pilot to plot the geographic bearing of the station from the aircraft. With existing plotters, human error can occur readily in such situations because of the mental computations involved.

This invention relates to a radio navigation plotter.

A principal object of this invention is to provide a novel and improved plotter which facilitates aircraft navigation from signals received from ground radio stations designated on a chart.

Another object of this invention is to provide such a plotter which may be used advantageously with OMNI (VOR) radio equipment or with ADF equipment on an aircraft.

Another object of this invention is to provide such a plotter which has novel provision for entering into the plotter itself any necessary compensation for the magnetic variation when operating in the ADF mode.

Further objects and advantages of this invention will be apparent from the following detailed description of a presently-preferred embodiment thereof, which is illustrated in the accompanying drawing.

In the drawing:

FIG. 1 illustrates part of a Sectional Chart depicting two OMNI broadcast stations and with the positions of an aircraft at successive times being fixed on the chart by the intersections of radials received by the aircraft from those two stations at those times;

FIG. 2 is a top plan view of the present plotter for use in navigating an aircraft in conjunction with such a chart; and FIG. 3 is a plan view on a larger scale showing the lower disc in the FIG. 2 plotter.

Referring first to FIG. 1, each of two OMNI (VOR) stations is designated on the Sectional Chart by a circle of a certain diameter, positioned with its zero degree calibration pointing toward magnetic North. Each OMNI station has a distinct broadcast frequency and each transmits 360 distinct radials, one for each degree circumferentially around the station. The zero degree radial transmitted by each station is aligned with magnetic North at the location of that station. The radials are provided by an omnidirectional reference phase sine wave signal and a rotating variable-phase sine wave signal that is in phase with the reference phase signal only at the zero degree radial, and elsewhere is out of phase by an electrical angle equal to the angular rotational displacement of that radial from the zero degree radial.

The OMNI receiving equipment on the aircraft resolves the one radial which it receives from a selected OMNI station into a line-of-position (LOP) dial indication which tells the displacement angle between Magnetic North and the aircraft, as measured from that OMNI station. For example, in FIG. 1 at time $t$-1 the aircraft is shown displaced approximately 80° from Magnetic North, as measured from OMNI station No. 1, and approximately 300° form Magnetic North, as measured from OMNI station NO. 2. At a later time, $t$-2, the aircraft is displaced approximately 130° from Magnetic North, as measured from OMNI station No. 1, and approximately 240° from Magnetic North, as measured from OMNI station No. 2. Therefore, the course of the aircraft can be plotted on the chart by tuning OMNI stations No. 1 and No. 2 in quick succession at time $t-1$ and noting the respective LOP readings, and later, at time $t-2$, tuning in these same stations in quick succession and noting the respective LOP readings. The position of the aircraft at time $t-1$ is located on the chart by drawing pencil lines from OMNI stations No. 1 and No. 2 along the respective radials which correspond to the LOP readings from these stations at time $t-1$. The intersection of these two radial pencil lines is the position of the aircraft at time $t-1$. The same procedure is followed when the LOP readings are taken at time $t-2$, and for the LOP readings taken at subsequent times. The course of the aircraft is depicted by drawing a straight line between successive intersections of the pencil lines drawn radially from the respective OMNI stations.

The plotting of the aircraft's position from OMNI stations using conventional techniques is unnecessarily laborious and time consuming, and it is a principal purpose of the present invention to facilitate such plotting in a novel and advantageous manner.

The present plotter has a lower disc 5 (FIG. 3), an upper disc 10 (FIG. 2), and an elongated arm 11 pivoted centrally on the discs and extending radially outward beyond the discs at one side. Each disc 5 and 10 is flat, circular and transparent, and they are of the same size, with the upper disc concentrically overlying the lower disc, and each may be turned with respect to the other.

The lower disc has a diametrical North-South line 6 that is to be positioned parallel to a geographic North-South line on a chart when the plotter is used for ADF (automatic direction finding) plotting from low frequency range stations or commercial radio stations, as explained hereinafter. The lower disc has two series of closely spaced lines 7,8, located respectively above and below its center, which extend parallel to its diametrical North-South line 6, and two series of closely spaced lines 27,28 on opposite sides of its center which extend perpendicular to line 6. At any position of the lower disc 5 on the chart, a pair of the lines 7,8 will be at or close to overlying registration with a geographic North-South line on the chart, or a pair of the lines 27,28 will be at or close to overlying registration with a geographic East-West line on the chart. These lines 7,8 and 27,28 facilitate bringing the diametrical line 6 on disc 5 into parallelism with a geographic North-South line on the chart.

A pair of perpendicularly-disposed cross hairs 29 and 30 intersect at the center of lower disc 5, cross hair 29 coinciding with the diametrical North-South line 6.

The lower disc 5 has a pair of pointers projecting beyond its periphery at opposite ends of the diametrical Norht-South line 6, as indicated by 31 and 32 in FIGS. 2 and 3.

The lower disc 5 may be set at any desired angular rotational position with respect to the upper disc 10 by a suitable releasable clamping arrangement (not shown), such as a nut on one disc engaging a screw-threaded stem on the other, concentric with the two discs.

The upper disc 10 has a 360 degree peripheral scale which is suitably calibrated, such as at single degree intervals. Inward from this scale, the upper disc has a circular line 13 of the same diameter as OMNI station circles on a Sectional Chart. This line is shown in phantom on the lower disc 5 in FIG. 3.

The elongated arm 11 overlies the upper disc 10 and has a narrow longitudinal slot 15, which extends radially outward from the center of the discs and provides a straight edge for guiding the point of a pencil. Slot 15 has a circular enlargement 16 overlying the cross hairs 29,30 at the center of the discs to make their intersection more visible. Above and below the slot 15, the arm 11 has statute mileage and nautical mileage scales, respectively, which are calibrated to indicate the respective mileages on the Sectional Chart from the center of the discs.

A suitable releasable clamping arrangement (not shown) may be provided for locking the radial arm 11 at any desired angular rotational position with respect to the upper disc 10. For example, such a clamping device may comprise a nut on the arm 11 engaging a screw-threaded stem on the upper disc 10 extending around the latter's center.

A slider 17 with a transparent window 18 is slidably mounted on the radial arm 11. This window has a hairline 19 which extends perpendicular to the slot 15 in arm 11 and overlies the scale marks on the opposite sides of this slot.

At the opposite side of the center of the discs from where it projects laterally beyond the discs, the radial arm 11 terminates in a circular edge 20 which registers with the circular inner edge of the 360 degree scale on the upper disc 10. The arm 11 has an arrow head marker 21 which is aligned with the longitudinal slot 15 and terminates at the aforementioned edge 20, so that this arrow head designates the angle on the 360 degree scale 12 which is 180 degrees from the angle where the slot 15 is located.

In using this tool in conjunction with radio reception from OMNI stations, for convenience the lower disc 5 may be clamped to the upper disc 10 with the North-South line 6 on the lower disc aligned with the 0–180 axis of the upper disc 10, as shown in FIG. 2. After the pilot has noted the LOP readings from two OMNI stations, as described already, he places the discs 5, 10 over one of these OMNI stations on the Sectional Chart with the circular line 13 on the upper disc 10 registering with the OMNI station circle and with the zero degree mark on the scale 12 on the upper disc registering with the zero degree (Magnetic North) mark on the OMNI station circle. Then he rotates the radial arm 11 about the center of the discs until its longitudinal slot 15 registers with the degree mark on scale 12 which corresponds to the LOP reading from this OMNI station. With the arm 11 held at this angular rotational position, he draws a pencil line along this slot 15 radially outward from this OMNI station on the chart. The same procedure is repeated at the second OMNI station on the chart from which LOP readings were taken. The intersection on the chart of the two pencil lines extending radially outward from the two OMNI stations designates the position of the aircraft when the LOP readings were taken from these two OMNI stations.

The distance of the aircraft from either OMNI station can be determined by positioning the tool as described relative to the selected OMNI station and then reading the appropriate scale mark on the radial arm 11 at the position of the slider hairline 19 when it overlies the intersection of the two radial lines on the chart.

The speed of the aircraft can be calculated as follows:

Note the respective times $t-1$ and $t-2$ when the OMNI readings are taken. Then, measure the straight-line distance on the chart between the intersection points for $t-1$ and $t-2$, respectively (which designate the positions on the chart of the aircraft at times $t-1$ and $t-2$, respectively). Then, divide this distance by the elapsed time between $t-1$ and $t-2$.

Having determined the aircraft's actual ground speed in this manner, the estimated time of arrival at the destination, or at some intermediate point on the route, can be calculated.

It is to be understood that the present tool may be used also for navigation in which during at least part of the flight the course of the aircraft is directly from one OMNI station to another OMNI station.

If the aircraft carries distance measuring equipment, the position from a single VOR/TAC OMNI radio station may be marked on the chart simply by drawing the radial pencil line on the chart from that station, as described, and marking on that line the position of the slider hairline 19 when it is at the scale position along the arm 11 which corresponds to the distance reading given by the distance measuring equipment on the aircraft.

The present tool also may be used in conjunction with ADF (automatic direction finding) equipment on the aircraft to plot the course of the aircraft, or determine its position, from the radio signals transmitted by low frequency range stations or commercial radio stations. The chart markings for such stations do not have any marking which designates the direction of Magnetic North.

The ADF equipment on the aircraft includes a radio compass which operates a dial indicator whose pointer tells the direction of the station from the aircraft, giving a "relative bearing" which is the number of degrees that the station is displaced clockwise from the nose of the aircraft. The gyro compass on the aircraft tells the magnetic heading of the aircraft, i.e., with respect to Magnetic North. The aircraft's magnetic bearing to the station is the sum of these two readings. However, the aricraft's true geographic bearing to the station can be determined only after taking into account the magnetic variation at the present geographic position of the aircraft.

In the present tool the lower disc 5 is adjusted to provide the correct compensation for this magnetic variation. This adjustment enables the user of this plotter to correctly plot the geographic bearing of the station from the aircraft without having to make any mental calculations for the magnetic variation.

The Sectional Chart has magnetic variation lines thereon, each telling the angular difference (expressed as degrees of longitude East or West) between magnetic North and true geographic North. The pilot reads from the chart the magnetic variation for his present aircraft position. Then he rotates the lower disc 5 with respect to the upper disc 10 by the same number of degrees and clamps the two discs together. When the magnetic variation is East, the lower disc is turned counterclockwise with respect to the upper disc from the position shown in FIG. 2, displacing the North-South line 6 on the lower disc angularly from alignment with the 0–180 axis of the upper disc by the same number of degrees as the magnetic variation. Conversely, when the magnetic variation is West, the lower disc 5 is turned clockwise with respect to the upper disc 10 from the position shown in FIG. 2, displacing the line 6 on the lower disc angularly from alignment with the 0–180 axis of the upper disc by the same number of degrees as the magnetic variation. In either case, the pointer 31 on the lower disc 5 shows this angular displacement on the 360 degree scale 12 on the upper disc 10.

For ADF plotting, after the pilot has taken in quick succession the ADF readings from two stations on the chart, he then does the following at each station location on the chart:

He places the lower disc 5 on the chart with the intersection of the cross hairs 29,30 on the lower disc centered over the station location on the chart and with the diametrical North-South line 6 on the lower disc positioned parallel to the nearest geographic North-South line on the chart, using the closely-spaced North-South lines 7,8 or the closely-spaced East-West lines 27,28 on the lower disc to facilitate this parallel positioning. Holding the lower disc firmly in this position on the chart, he pivots the radial arm 11 about the center of the discs until the arrow head 21 registers with the degree mark on the 360 degree scale 12 on the upper disc 10 which corresponds to the ADF reading from this station. With the radial arm clamped in this angular rotational position, he draws a pencil line on the chart along the slot 15 radially outward from the station. This pencil line designates the geographic bearing of the aircraft from the station.

The intersection of the pencil lines from the two stations designates the aircraft's geographic position at the time the ADF readings from these stations were taken.

In using the present plotter in the ADF mode, as just described, the pre-adjustment of the lower disc 5 enables the automatic conversion from magnetic bearing to geographic bearing without requiring the pilot to make mental calculations which may result in errors. The marker 21 on the elongated arm 11 coacts with the 360 degree scale 12 on the upper disc 10 to enable the user to set the arm 11 at the angular rotational position which corresponds to the ADF reading from a particular station, again without requiring the pilot to make mental calculations.

In the use of this plotter in both the OMNI mode and the ADF mode, the narrow slot 15 in the radial arm 11 makes it exceptionally easy to draw the radial lines from the radio broadcast stations on the chart. The calibrated scales on arm 11 above and below the slot 15 make it a simple matter to determine the aircraft's distance from a particular station, either in statute miles or in nautical miles.

While a presently-preferred embodiment of this invention has been shown and described, it is to be understood that various modifications, omissions and refinements which depart from the disclosed embodiment may be adopted without departing from the essential teaching of the invention.

I claim:

1. A radio navigation plotter comprising:
    first and second concentric discs, said second disc having a 360 degree calibrated scale extending circularly about its center, and said first disc having a diametrical North-South line thereon, said first disc being rotatable with respect to said second disc about their common center to displace said North-South line angularly from alignment with the 0–180 axis of the 360 degree scale according to the magnetic variation at a particular geographic location, one of said discs having a center marking and being transparent around said center marking;
    and an elongated arm pivoted on said discs to turn about their common center, said arm extending laterally beyond one side of the discs and presenting a straight edge which extends radially outward beyond said discs, said arm having a marker aligned with said straight edge and located at the opposite side of the common center of the discs to designate on said scale an angle 180 from the angular position of said straight edge.

2. A plotter according to claim 1, wherein said first disc has a plurality of closely spaced lines thereon extending parallel to said diametrical North-South line and disposed on opposite sides of the latter.

3. A plotter according to claim 1, wherein said first disc has a projection extending beyond the periphery of said second disc and aligned with said diametrical North-South line on said first disc for indicating the magnetic variation on said 360 degree scale on said second disc.

4. A plotter according to claim 3, wherein said second disc has a circular line thereon located inward from and concentric with said 360 degree scale and of the same size as an OMNI station circle on a Sectional Chart, said first disc has a plurality of closely spaced lines thereon which extend parallel to said diametrical North-South line and are disposed on opposite sides of the latter, said elongated arm has a longitudinal slot therein which defines said straight edge, and said arm has two scales, one calibrated for statute miles and the other calibrated for nautical miles, which are located respectively on opposite sides of said slot and are calibrated respectively radially outward from the center of the discs.

* * * * *